United States Patent [19]
Crane

[11] 3,797,308
[45] Mar. 19, 1974

[54] AIRCRAFT LANDING ALTIMETER
[76] Inventor: Carl J. Crane, Box 316, Helotes, Tex. 78023
[22] Filed: Nov. 6, 1972
[21] Appl. No.: 303,828

[52] U.S. Cl. .............................. 73/178 T, 73/386
[51] Int. Cl. ....................... G01c 21/00, G01l 7/12
[58] Field of Search.......... 73/386, 387, 179, 178 T, 73/178 H

[56] References Cited
UNITED STATES PATENTS
1,935,736  11/1933  Colvin et al. .................... 73/179
2,347,134  4/1944  Sidwell............................. 73/386
3,282,111  11/1966  Andresen, Jr..................... 73/386

Primary Examiner—Donald O. Woodiel
Attorney, Agent, or Firm—Krafft & Wells

[57] ABSTRACT

An aircraft landing altimeter is obtained for indicating height above touchdown of a landing aircraft after passing a known distance and known height from touchdown point. The indicator pointer responds to static atmospheric pressure difference between the touchdown point and that along the glide slope (ILS) at a selected marker beacon site.

3 Claims, 13 Drawing Figures

PATENTED MAR 19 1974　3,797,308
SHEET 1 OF 2
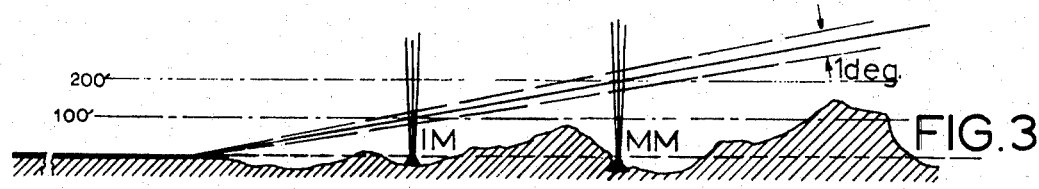
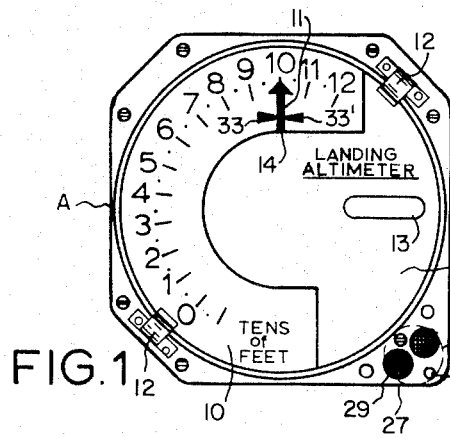
FIG.1
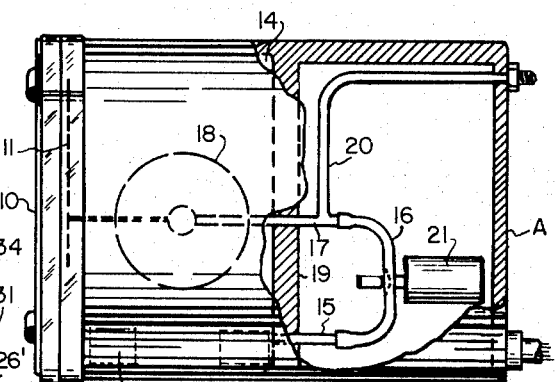
FIG.2
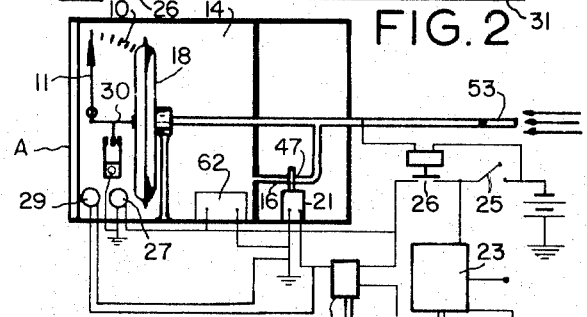
FIG.4
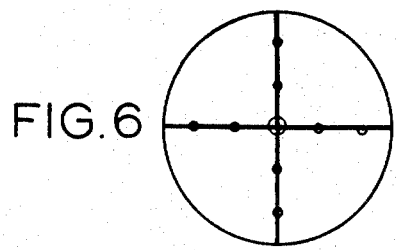
FIG.6
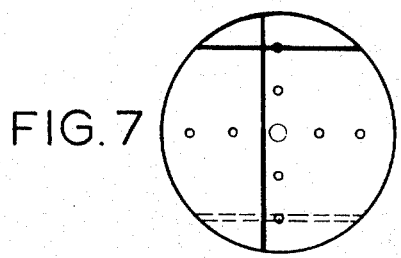
FIG.7
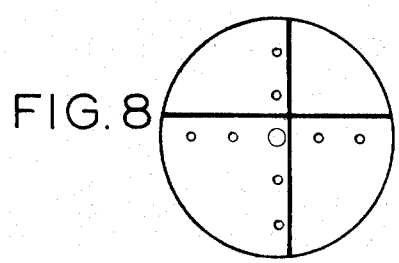
FIG.8
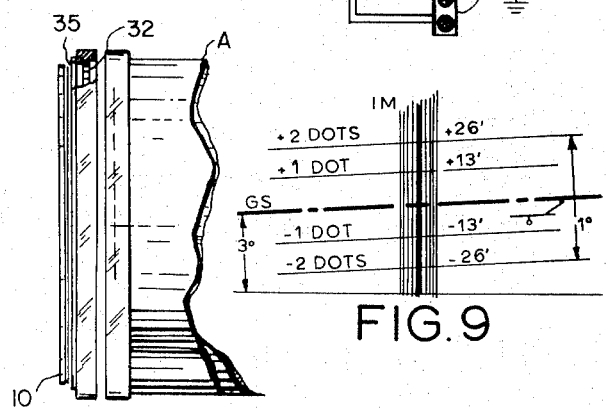
FIG.5
FIG.9

3,797,308

AIRCRAFT LANDING ALTIMETER

BACKGROUND OF THE INVENTION

1. Field of the Invention

The present invention makes use of a sensitive differential pressure gage to drive a pointer over a dial which is calibrated in height above touchdown. The diaphragm of the gage is subjected to equal pressure inside and out until the aircraft arrives at a known height above touchdown as, for instance, the intersection of a glide slope axis and a marker beacon. At this known height above touchdown the existing static pressure within the case of the sensitive differential pressure gage is maintained by instantly closing off access to atmospheric pressure. The diaphragm interior is subject to the increasing static pressure of the atmosphere as it loses altitude to the runway touch down zone. This change of differential pressure becomes a measure of altitude change and is indicated on the altimeter dial.

2. The Prior Art

The only authorized landing altimeters for aircraft recognized by the Federal Aviation Administration are radio altimeters. Their use and characteristics are described in FAA Advisory Circular, AC No. 120–28A dated Dec. 14, 1971. Two are required and those acceptable are very costly and subject to error of plus/-minus five feet.

Heretofore barometric altimeters which utilize an evacuated aneroid diaphragm have been employed in many arrangements for indicating altitude. These types, due to the employment of evacuated diaphragms are subject to errors of structure such as hysteresis, mechanical error, friction error, scale error and setting error. The latter error can involve error on the part of the aircraft pilot or oe part of the ground personnel in transmitting the altimeter setting to the pilot by radio, or a combination of both. One example of the effort to secure accurate setting of an aneroid type of altimeter is shown in U.S. Pat. No. 2,167,412.

A ground proximity indicator that utilizes the so-called ground effect noticed in landing a fixed wing aircraft is described in U.S. Pat No. 3,348,412. A differential pressure gage is utilized to obtain an indication of ground proximity by sensing both a static pressure below the wing and above on the fuselage, hardly meeting a requirement for altitude information from 100–200 feet altitude to touchdown.

SUMMARY OF THE INVENTION

The instant invention utilizes the difference of (static) atmospheric pressure between known levels, namely between the runway touchdown point and a point on the glide slope where it intersects a marker beacon, either inner, middle or outer, or at any other identifiable point on the glide slope such as can be established where a VOR radial intersects the glide slope radiated space pattern. Since marker beacon intersection defines a distance from touchdown, suitable precision DME (distance measuring equipment) can manually or automatically signal the passage of a known height/distance to start operation of the landing altimeter. Since the glide slope path is well defined in space, usually having an angle of 2.5 to 3.5 degrees with the horizontal it is only necessary to know the distance to touchdown in order to determine the height above it an an identifiable point on te glide slope.

In this invention a differential pressure gage of high sensitivity is arranged to retain on the outside of the relaxed diaphragm the atmospheric pressure existing at the reference height above touchdown as the aircraft passes the reference height while allowing the building pressure within the diaphragm to indicate the altitude change to touchdown. Since the time involved during the aircraft passage of say the middle marker to touchdown is a matter of seconds there can be no appreciable barometric change to affect the accuracy of measurement of the pressure difference.

The convenience of using the marker beacon signal to actuate the altimeter makes for simplicity and accuracy and only requires the use of already installed equipment in most aircraft. It is this signal which energizes a solenoid to close the access port of the differential pressure gage low pressure side to atmospheric (static) pressure at the programmed height above touchdown.

Accordingly it is an object of this invention to provide a landing altimeter for aircraft that uses existing atmospheric pressure difference between a known reference point above the touchdown zone and the touchdown zone.

It is another object of this invention to provide means for compensating the altimeter reading to provide for variations of aircraft flight path above or below the glide slope path.

BRIEF DESCRIPTION OF THE DRAWINGS

FIG. 1 is the indicating face of one form of the landing altimeter.

FIG. 2 is a cutaway schematic side view of the altimeter of FIG. 1.

FIG. 3 depicts glide slope and marker beacon space patterns in relation to a runway touchdown zone and adjacent terrain.

FIG. 4 is a schematic portrayal to describe function of the altimeter.

FIG. 5 is an exploded view of part of the indicating bezel of the altimeter.

FIGS. 6, 7, and 8 indicate exemplary indications of a glide slope pointer and associated localizer pointer.

FIG. 9 depicts dimensional elements of glide slope and marker beacon space patterns.

DESCRIPTION OF THE PREFERRED EMBODIMENT

Figure 10:
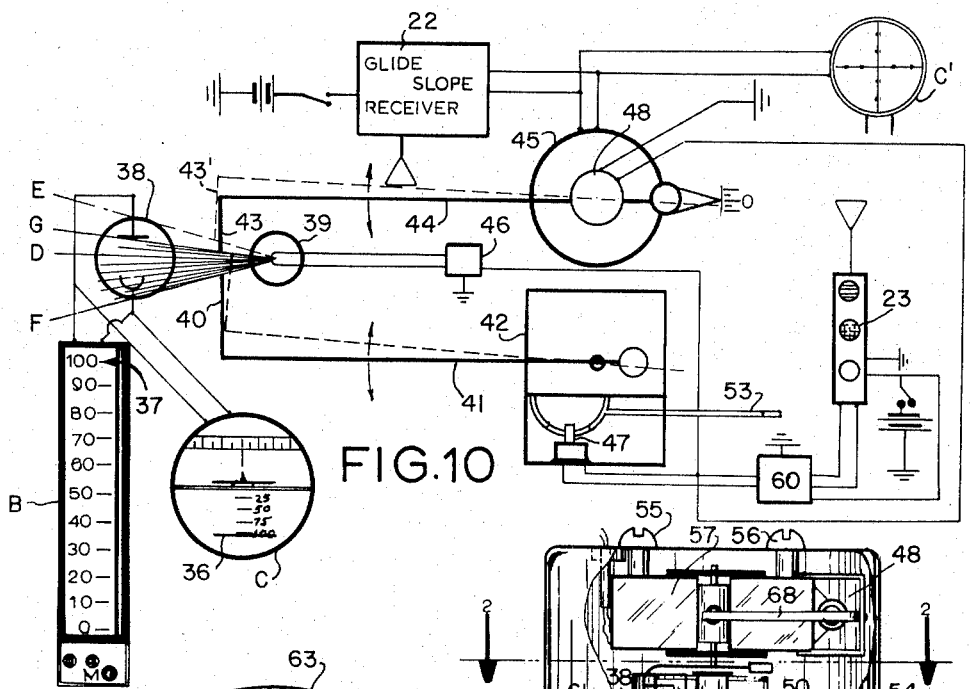
FIG. 10 depicts schematic arrangement of the remote indicating form of the landing altimeter.

The aircraft landing altimeter of the present invention can best be described by reference to the drawings.

In the preferred embodiment there are two forms, one the direct reading form shown in FIGS. 1, 2, 4 and 5, and the other the remote reading form as depicted in FIGS. 10, 11, 12 and 13.

In the direct reading form, reference is made to FIGS. 1, 2 and 4 in which the numeral 10 is an adjustable dial swept by a diaphragm driven pointer 11. The dial 10 is fabricated of glass or clear plastic and has the numerals that display height above touchdown, and the associated scale marking, delineated on the underside of the circular dial. The dial 10 is positioned beneath the holding clips 12 and 12' for adjustment in either clockwise or counterclockwise movement. The nominal height above touchdown of the glide slope axis at the inner marker IM (FIG. 3) is 100 feet and this is the established equipment of CAT II (Category II) ILS (instrument landing system) runways. In the event it is desired to establish the reference altitude as 200 feet above touchdown the middle marker (MM) position along the glide slope would be selected and the scale on the dial would be expanded accordingly. For purpose of description herein below the 100 foot altitude above touchdown zone calibration is selected.

In order to understand the structure and function of the landing altimeter reference is made to FIG. 3 in which is shown the related radiated space patterns of the conventional glide slope transmitter and two of the three marker beacons associated with the ILS which also includes a localizer transmitter whose space pattern is used to provide lateral guidance to the runway and along its centerline. As noted in FIG. 3 the inner marker is positioned so that its center line (nominally) intersects the glide slope at a point 100 feet above the touchdown zone of the runway. In practice this height varies so that at the San Antonio CAT II runway this intersection is actually 108 feet above the touchdown zone. Accordingly the dial 10 of the instrument may be rotated counterclockwise until the value of 108 feet appears above the pointer 14 preparatory to beginning the approach/landing.

The glide slope radiated space pattern is so designed that (FIG. 9) its "thickness" at the inner marker is 52 feet. This means that the deflection shown in FIG. 7 of the glide slope pointer indicates that the aircraft is two dots, or 26 feet below the glide slope. Most instrument rated pilots can keep the aircraft within a quarter dot (3-4 feet) plus or minus of the glide slope centerline at a selected instant while flying manually. Under automatic (coupled) approach control the accuracy should be within one and one-half feet plus or minus of the center line. The accuracy noted above for manual controlled flight has been checked experimentally in flight.

However, to be described below, means are provided to automatically compensate the landing altimeter indication for position error, above or below the glide path.

Since the function of the landing altimeter is dependent upon atmospheric pressure, which is known to vary at different elevations above sea level, and to vary at the same elevation at different times, consideration of this phenomenon must be given in so far as practical usage of the altimeter is concerned. For purpose of illustration it will be assumed that standard sea level pressure (29.92"of Hg) exists at a sea level airport at the location of the inner marker where as noted above the glide slope axis is 108 feet above the marker. Now if the barometer should fall suddenly to a value of 28.92 during the nine second interval between passage of marker to touchdown, a highly improbable circumstance, the pilot would be confronted with a two foot error of altitude, about the same error he would experience if he landed at an airport a thousand feet higher than sea level without a change in barometric reading. If he flew from the sea level airport to land at one at say 7000 feet (Colorado Springs) an error of approximately 14 feet would be encountered, assuming standard barometric pressure existed there. So if the HAT landing altimeter was calibrated for a median altitude of say 3500 feet above sea level the greatest expected error would be approximately plus or minus 7 feet. This error is less than that claimed for some expensive contemporary radio altimeters.

Nevertheless altimeter setting data would be tabulated on the "approach plates" (FAA approved instrument landing data) for each airport as is now standard procedure to include HAT (height above touchdown) which would include the standard atmosphere value for the airport. In other words atmospheric pressure changes except those encountered in the violent or tornado type of weather would have little practical effect on the accuracy of the present invention.

The sensitive differential pressure gage A consists of a pressure tight case 14 with a metallic connecting tube 15 which leads to an elastic tube 16, which in turn connects with the metallic tube 17 (FIG. 2) which connects to the diaphragm 18. The tube 17 is pressure sealed where it passes through the case wall 19. The tube 17 has another branch 20 which leads to an external source of static pressure about the aircraft. Accordingly the same normal static pressure exists in the case, the diaphragm and interconnecting tubes at all times except when the solenoid 21 is activated at passage of the marker beacon to clamp off and hold the static pressure within the thermally insulated case while permitting an increase in static pressure, attending lowering of height, within the diaphragm. This change of pressure difference is indicated as noted above on the indicating face of the instrument. Normally the pressure differential experienced will amount to about 1.44 inches of water, when the inner marker is the reference or 2.88 inches of water when the middle marker is the reference.

FIG. 4 is a schematic presentation of the direct indicating form of the invention which shows the combined function of a moving aircraft along a glide slope emanating from a ground based glide slope transmitter and received by an associated airborne glide slope receiver 22, an associated ground based marker beacon transmitter and an airborne marker beacon receiver 23. The latter causes the selected (middle or inner) marker lamp circuit, in this explanation the inner marker lamp circuit, to energize the holding relay 24, which in turn energizes the solenoid 21 to clamp the tube 16. The main switch 25 and the sensitive circuit breaker 26 must of course be closed in order for the operation to take place. With these switches on, the pilot light 27 will be illuminated. When the marker is passed the appropriate lamp in the receiver panel 28 will flash, while the marker lamp 29 on the face of the instrument will remain on to show closure of the solenoid and hence to confirm operation of the instrument. The system remains "ON" until landing and turn off a main switch, or "missed approach" with attendant altitude change which will cause the diaphragm switch 30 to activate the circuit breaker 26 which will de-energize the solenoid 21 permitting the differential pressure to return to normal static pressure and allowing the holding relay and solenoid to return to "ready" after re-setting the circuit breaker 26. The circuit breaker 26 and related wiring is located in an integral but separate case compartment 31; the circuit breaker plunger 26' is located (FIG. 1) in the face of the instrument. This plunger may be hand actuated to open or close the circuit breaker.

The diaphragm switch 30 also serves to guard the diaphragm against any inadvertent over or under pressure. The front bezel of the instrument is sealed by the cover glass 32 (FIG. 5) through which may be seen the indicating pointer 11 which sweeps over a blank dial, except for the (FIG. 1) two arrows 33 and 33' which establish the "zero" position of the pointer, and consequently the relaxed diaphragm position. These arrows insure that no friction or other mechanical error exists in the diaphragm mechanism. Bonded to the outer surface of the cover glass 32 is the irregular mask 34 which serves as a name and instruction surface. Immediately above this mask is a thin ring gasket 35 composed of Teflon (FIG. 5) upon which rests the transparent indicating dial 10 which is frictionally held in place by the spring clips 12 and 12' of FIG. 1.

To make use of the direct indicating form of the invention the knob 13 is used to rotate the indicating dial until the pointer rests under the selected HAT (height above touchdown value) for the point of landing. As noted above this value will reflect the algebraic sum of the surveyed height of the glide slope above the level of the touchdown point and a correction value that reflects the *median* barometric (standard atmosphere) value corrected to sea level.

Each aircraft installation will require calibration to adapt the altimeter reading/setting depending upon the height of the glide slope antenna above the landing wheels at touchdown. In tremendously large aircraft (C-5) the 200 foot middle marker calibration would probably be used.

Since vertical wind shear or inexact flying may be encountered as the aircraft passes the selected marker beacon locus it may be desirable to use the remote reading form of the preferred embodiment of the invention which is illustrated principally in FIGS. 10 to 13 inclusive. It will be noted that both forms employ like structure and principle of operation but provide means for remotely locating the indicating scale or scales as noted in FIG. 10. The remote indicator B is a vertical scale microammeter the scalar value of which represents 100 feet of height change from 100 feet above touchdown to touchdown point. This indicator could be used alone, or in an electrical parallel arrangement with the microammeter described in my U.S. Pat. No. 3,292,176 and U.S. Pat. No. 3,307,191, which shows the dual employment of the glide slope pointer and is represented by C or C' of FIG. 10. In this case the rising pointer 36 will move from the 100 foot value to the horizon line or zero position as the pointer 37 of B moves downward from 100 to 0, as the aircraft approaches the touchdown point from its position over the inner marker.

Figure 12:
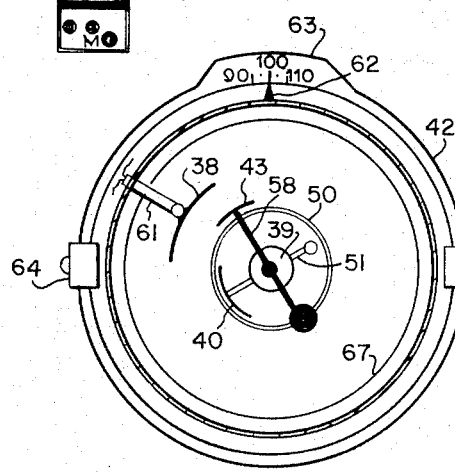
FIG. 12 is a sectional view taken of the altimeter on line 2—2 of FIG. 11.

In order to secure this remote indication on either or both microammeters reference is made to FIG. 10 in which the photovoltaic cell 38 is energized by light from the lamp 39. One shutter 40 is attached to the pointer 41 of the sensitive differential pressure gage 42 the structure and function of which is alike in all respects to that shown in FIGS. 1, 2 and 4. Another shutter 43 is attached to the pointer 44 of a glide slope microammeter 45. With the differential pressure at zero, such as when the aircraft has not yet reached the selected marker beacon but is on the glide slope (FIG. 6) both the above shutters are positioned as shown in FIG. 10 and FIG. 12. Under this condition the lamp 39 whose voltage is controlled by the voltage regulator 46 partially illuminates the photocell to produce a reading of 100 feet on the meters B and C. At the instant of passage of the selected marker beacon should the aircraft be two dots low as indicated in FIG. 7 the shutter 43 would move counterclockwise to cast a shadow on the photocell along a light ray D from the lamp 39 which would produce an indication of 74 feet on the remote indicating meters. The value of height so established at passage of the marker is the fixed maximum indication because at instant of passage, where the solenoid closure valve 47 is triggered (FIG. 10), so is the meter brake 48. This holds the shutter 43 in position since the glide slope correction pointer 44 must be held in reference position.

In the event the aircraft should be two dots high at time of marker passage, the static pressure differential noted at touchdown would be that associated with a pressure change responsive to 126 feet. Accordingly each meter B and C would, if calibrated say to 200 feet, show this indication. In the instant example then the pointer of meter 45 would move clockwise and be braked on marker passage at light ray E from the lamp 39. In this case the instrument would begin to read a lowering height when the aircraft passed through the 100 foot height above touchdown. It will be noted that this extreme deflection of the shutter 43 is shown in FIG. 10 at 43'. The shutter 40 would also then move to the light ray E to signify reaching touchdown height.

The aircraft precisely following the glide slope will insure that the meter pointer 43 and associated shutter is as shown in FIG. 10, at instant of marker passage and the differential pressure gage pointer 41 and its associated shutter 40 along light ray F is also as shown in FIG. 10. At the instant of passage of the marker the shutter 40 begins its move to the touchdown position and the light striking the photocell is then completely shadowed along the light ray G, from the lamp by shutter 40' to produce the zero indication at touchdown.

Figure 11:
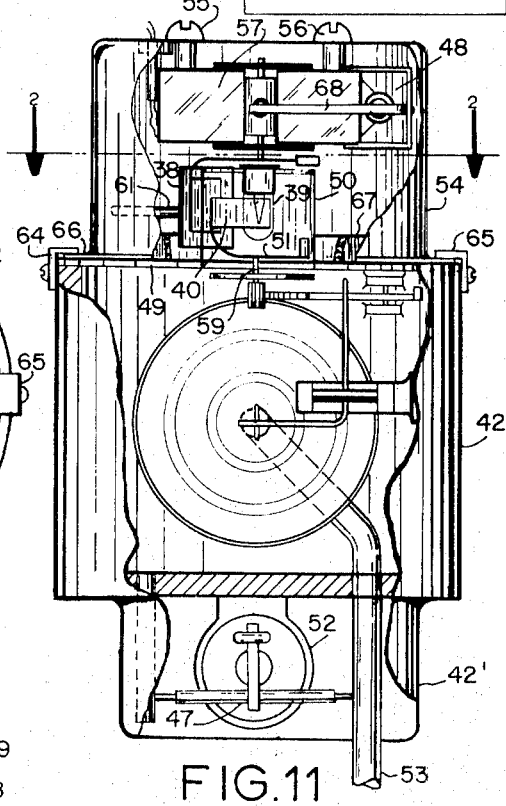
FIG. 11 shows partial cutaway detail of structure of landing altimeter for remote indication.
Figure 13:
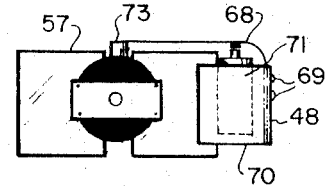
FIG. 13 is a partial side view of the brake mechanism of FIG. 11.

The structure just described with reference to the schematic presentation of FIG. 10 will find its counterpart in FIGS. 11, 12 and 13. It will be noted that the diaphragm type of sensitive differential pressure gage 42 is fitted with a pressure tight transparent cover 49 which is bonded to a transparent closed cylindrical cupola 50. Extending upwardly through an aperture in the cover glass into the cupola is the pointer/shutter structure 51 which is fixed to and driven by the diaphragm movement of the differential gage as is well understood in the art. A lower sub-case 42 contains the clamping solenoid 52 which when activated seals the static pressure within the case 42 while permitting changing static pressure to reach the diaphragm interior through the static line 53 which connects with the static source of the aircraft.

Contained within the housing 54 and fixed to the upper part of it by means of screws 55 and 56 is a glide slope microammeter movement 57 which drives the pointer/shutter structure 58. The pointer shaft is concentric with the shaft 59 of the differential pressure gage and the shutter 43 sweeps concentric with and outside of the cupola 50 which contains the pressure sealed-in lamp 39 which is activated when the relay 60 activates the solenoid 52 and its associated valve 47.

The housing 54 also supports the photocell 38 by means of a tubular brace 61 which serves also to house the photocell electric leads that are connected to the indicating meters. To avoid confusing the drawings all electric wire leads are eliminated as their function is explained. The housing may be rotated from its position shown in FIG. 12 where a pointer 62 indicates the nominal height above touchdown at the inner marker. Turning this housing clockwise displaces the photocell locus *and* the shutter 43 (as well as the glide slope meter itself) through an equal angle. This in effect moves the touchdown zero light cutoff to accommodate a higher setting at marker passage as for instance 110 feet as noted on the scale 63. Opposite rotation of the housing causes early cutoff of light to photocell exemplified by lower pressure difference and hence smaller travel of the shutter 40. The spring clips 64 and 65 hold the lip 66 of the housing 54 which has its lower opening seated on the cover glass around an annular guide ring 67.

The brake mechanism (FIG. 13) consists of a spring 68 (non-ferrous) which has one end anchored by rivet 69 to the bracket 70 which supports the electromagnet 71 whose case attracts the armature 72 of the spring 68 to cause the friction tip 73 to hold the armature of the glide slope meter from rotation until holding relay 60 is released by deactivation of the control circuit.

In order to eliminate temperature compensation structure, normally a part of a sensitive differential pressure gage, as well as to insure that all parts, including the trapped volume of air within the gage case (and any extension of it) is maintained at a constant temperature, the thermostatically controlled heater unit 74 of any suitable design, well known in the art, is included in that thermally insulated case portion containing the sensitive diaphragm and connected mechanism. The controlled temperature will be that at which experience shows is the maximum ambient temperature to which the gage would normally be subjected in service.

Although the present invention has been described in connection with the preferred embodiment, it is to be understood that modifications and variations may be resorted to without departing from the spirit and scope of the invention, as those skilled in the art will readily understand. For example, there are many types of pressure sensors which could replace the metallic diaphragm of the gage, one being for instance a special elastomer similar to that used in the familiar Dwyer magnahelic differential pressure gage.

I claim:

1. In an aircraft height-above-touchdown indicating system, a differential pressure gage having an indicating pointer positioned adjacent a rotatable dial calibrated in units of height, an aircraft supporting said differential pressure gage, a marker beacon receiver supported within said aircraft,
a glide slope receiver supported within said aircraft for the purpose of providing glide slope guidance to the pilot of said aircraft,
a flexible wall diaphragm supported within said differential pressure gage case,
said case having airtight construction with an outlet, said outlet connected by a tube leading to the interior of said diaphragm,
said tube having a flexible portion and provided with a T-connection having a first branch leading to the static pressure system of sair aircraft in order to provide equal static pressure to said case interior as well as to the interior of said diaphragm;
a solenoid positioned adjacent said flexible portion of said tube, said solenoid having a moving armature extension arranged to clamp said flexible portion at a locus between said outlet of said case and said T-connection; and
electric relay and switching means for activating said solenoid when said aircraft supported beacon receiver is activated in response to a ground based marker beacon transmitter, linkage mechanism between said flexible diaphragm of the differential pressure gage and said indicating pointer to activate said pointer at the activation of said marker beacon receiver in order to indicate differential pressure change as a function of changing height of said aircraft with relation to the static pressure extant within said airtight case of said differential pressure gage after activation of said solenoid.

2. The system of claim 1, with associated radio marker beacon receiver and associated glide slope receiver and with electro-mechanical valve means for selectively maintaining static pressure within said case of said differential pressure gage, a ground based glide slope transmitter, relay means for controlling said electromechanical valve means in response to energy impulse output from said marker beacon receiver,
an associated ground based marker beacon transmitter selectively co-located along the transmitted space pattern of said glide slope transmitter in order to define a locus in space above an aircraft landing runway that defines the locus of activation of said electromechanical valve means in order to maintain in said case the atmospheric static pressure existing about said aircraft upon closing of said electro-mechanical valve,
and a photocell,
a lamp source of illumination,
a moving arm made responsive to movement of said diaphragm,
a shutter means attached to said moving arm for controlling the amount of light reaching said photocell from said lamp and electric meter means for indicating said photocell current, and
said meter means calibrated in units of height proportional to the differential pressure existing in said differential pressure gage.

3. The system of claim 2, having a zero-center electric meter having a pointer supported shutter, said shutter co-located with the shutter supported on the driven arm of the diaphragm of the differential pressure gage, said zero center electric meter made responsive to the output of said glide slope receiver in order to vary the exposed sensitive area of said photocell to the light source in proportion to the positive or negative current flow through said zero center electric meter, the current being proportional to the aircraft position with respect to the glide path, brake means for holding the instant position of said zero center electric meter movement at the time of activation of the electromechanical valve, and means for relasing said brake means upon deactivation of the electromechanical valve.

* * * * *